United States Patent [19]
Nishikawa et al.

[11] Patent Number: 5,997,781
[45] Date of Patent: *Dec. 7, 1999

[54] INJECTION-EXPANSION MOLDED, THERMOPLASTIC RESIN PRODUCT AND PRODUCTION PROCESS THEREOF

[75] Inventors: Shigeo Nishikawa; Kaoru Yorita; Kouzo Ichikawa; Haruo Inoue; Michio Eriguchi; Takanori Sueda; Hideo Amemiya, all of Kanagawa, Japan

[73] Assignee: Mitsui Chemicals, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/829,603

[22] Filed: Mar. 31, 1997

[30] Foreign Application Priority Data

Apr. 4, 1996 [JP] Japan ................................. 8-082493
Dec. 19, 1996 [JP] Japan ................................. 8-339702

[51] Int. Cl.$^6$ ................................. B29D 67/20
[52] U.S. Cl. ........................ 264/45.1; 264/40.3; 264/50; 264/52; 264/54; 264/255; 264/DIG. 13
[58] Field of Search ................ 428/318.6, 318.8, 428/319.7, 315.7, 315.9; 264/40.3, 45.1, 50, 51, 52, 54, 255, DIG. 13

[56] References Cited

U.S. PATENT DOCUMENTS

| | | |
|---|---|---|
| 4,473,665 | 9/1984 | Martini et al. . |
| 4,761,256 | 8/1988 | Hardenbrook et al. ................ 264/45.5 |
| 5,075,162 | 12/1991 | Okubo et al. ........................ 428/304.4 |
| 5,158,986 | 10/1992 | Cha et al. . |

FOREIGN PATENT DOCUMENTS

| | | |
|---|---|---|
| 3436361 | 4/1986 | Germany . |
| 8-11190 | 1/1996 | Japan . |

*Primary Examiner*—Blaine Copenheaver
*Attorney, Agent, or Firm*—Burns, Doane, Swecker & Mathis, L.L.P.

[57] ABSTRACT

Disclosed is a process for the production of an injection-expansion molded, thermoplastic resin product. The process comprises a gas dissolving step, a cooling step, a metering and injection step, and an expansion controlling step. Specifically, a thermoplastic resin is molten in a continuous plasticator (1), supercritical carbon dioxide and/or nitrogen is added as a blowing agent, and the blowing agent and the thermoplastic resin are formed into a mutually-dissolved state. The resultant molten resin composition is cooled within the plasticator while maintaining a pressure equal to or higher than a critical pressure of the blowing agent. The thus-cooled molten resin composition is metered by an injector (7) and is filled in a mold (8). An internal pressure of the mold is lowered beyond the critical pressure of the blowing agent to produce cell nuclei, whereby the cell diameter is controlled. The blowing agent is maintained in a supercritical state up to the metering and injection step.

9 Claims, 8 Drawing Sheets

Unexpanded Portion ←→ Expanded Portion ←→ Unexpanded Portion

1mm

INJECTION-EXPANSION MOLDED, THERMOPLASTIC RESIN PRODUCT AND PRODUCTION PROCESS THEREOF

BACKGROUND OF THE INVENTION

1) Field of the Invention

This invention relates to an expanded thermoplastic resin product having excellent physical properties and surface appearance, and more specifically to an injection-expansion molded, thermoplastic resin product comprising an expanded portion, which contains cells of a very small average cell diameter and a uniform average cell population, and as a surface layer, an unexpanded portion integrated with the expanded portion and having a good external appearance. This invention is also concerned with a process for producing the expanded product by using carbon dioxide and/or nitrogen as a blowing agent.

2) Description of the Related Art

For the production of expanded thermoplastic products, processes making use of a chemical blowing agent or physical blowing agent are known.

A chemical expanding process generally comprises mixing raw material with an organic blowing agent of a low molecular weight, which decomposes at a molding temperature to produce gas, and then heating the resulting mixture to a decomposing temperature of the blowing agent or higher to effect expansion molding. According to this process, the production of gas is proportional to the molding temperature, and the decomposition temperature can be easily adjusted by adding an expanding aid or the like. Moreover, this process can obtain expanded products having closed cells.

However, in addition to high production cost for the use of a special blowing agent, these expanded products tend to develop discoloration, offensive odor, food sanitation problems and the like due to decomposition residues of the blowing agent, said decomposition residues remaining in the expanded products. There are other problems including smearing of molding machines caused by a chemical blowing agent and defective molding associated with such smearing.

On the other hand, a gas expanding process is a physical expanding process and comprises melting a resin in a molding machine, feeding an organic compound of a low boiling point such as butane, pentane or dichlorodifluoromethane to the resin, kneading the resin and the organic compound together, and then releasing the resulting mixture into a low-pressure zone to effect expansion molding. The organic compound of the low melting point, which is employed in this process, has high compatibility with the resin and is hence excellent in solubility and also in retention, so that it features the availability of expanded products of high expansion ratios. Nonetheless, such blowing agents are costly and moreover, have dangers such as inflammability and toxicity. They also have a potential problem of air pollution. Further, there is a move toward the total ban of freon series gases led by dichlorodifluoromethane in view of environmental problems such as destruction of the ozonosphere.

With a view to overcoming such problems of the conventional processes, numerous processes making use of an inert gas such as carbon dioxide gas or nitrogen as a blowing agent, said inert gas being clean and economical, have been proposed. However, the inert gas has poor solubility in a resin because of its low compatibility with the resin. Expanded products have large and uneven cell diameters and low cell populations, leading to problems in external appearance, mechanical strength, heat insulating properties and expansion ratio.

Concerning injection-expansion molding for structural foams, various processes have also been proposed. Expanded products available by these processes have stiffness 3 to 4 times as much as conventional injection-molded products, because a sandwich structure composed of surface skin layers and an intermediate core layer is formed and their volumes are effectively increased by the expansion when compared at the same resin weight. It has however been pointed out that cell diameters of expanded products produced by these processes are as large as 50 to 100 $\mu$m and are uneven and hence that in impact strength tests, their cells become starting points for breakage to result in lowered impact strengths.

As a technique for resolving these problems, U.S. Pat. No. 4,473,665 discloses a production process for obtaining an expansion-molded product with very small cells of 2 to 25 $\mu$m in diameter uniformly distributed therein. According to this process, a thermoplastic resin sheet is first impregnated under pressure with an inert gas until saturation. Thereafter, the sheet is heated to a glass transition temperature of the thermoplastic resin, and is then depressurized so that the gas impregnated in the resin is brought into an over-saturated state to form cell nuclei. The sheet is then rapidly cooled so that the growth of cells is controlled. Further, a production process by extrusion forming or injection molding is also exemplified. This expansion forming or injection molding makes use of a process which comprises heating and melting a thermoplastic resin, which has been saturated beforehand with an inert gas under pressure, shaping the thus-molten thermoplastic resin under pressure, cooling and depressurizing the resin to form cell nuclei, and then cooling the resin to control its cell diameter. By these processes, expanded products containing a number of very small cells can be obtained. It is however substantially difficult to industrially practice these processes, because an inert gas has low compatibility with a resin and more than ten hours are required to fully impregnate the resin with the gas.

U.S. Pat. No. 5,158,986 discloses a technique for obtaining an expanded product, which has extremely small cell diameters and a high cell population, by using a supercritical fluid as a blowing agent and impregnating a thermoplastic resin with the supercritical fluid. As a supercritical fluid has excellent solubility similar to that of a liquid and superb diffusibility close to that of a gas, the resin can be impregnated with the blowing fluid in a short time. Two processes are proposed for obtaining expanded products in this patent publication, one comprising forming a thermoplastic resin into a sheet through an extruder, introducing the sheet into a pressurized chamber filled with carbon dioxide in a supercritical state to impregnate the sheet with carbon dioxide, and then heating the sheet in an expanding chamber under atmospheric pressure to cause the sheet to expand; and the other comprising melting a resin in an extruder, impregnating the molten resin with carbon dioxide in a supercritical state, extruding the resulting impregnated resin into a sheet-like product, introducing the sheet-like product into a pressurized chamber to form cell nuclei due to the pressure difference, and then heating or cooling the resultant sheet to control the diameter and population of cells.

Both the processes however require large-scale high-pressure facilities and hence an enormous initial cost and are poor in work efficiency, so that they can be hardly practiced on an industrial scale. Further, the former process requires a long time for the full impregnation of the sheet-like product with carbon dioxide because the sheet-like product is directly impregnated. on the other hand, the latter process impregnates carbon dioxide into the molten resin so that the penetration speed of carbon dioxide in the latter process is faster than that in the former process. It is however difficult to perform both the mixing of carbon dioxide and the formation of numerous cell nuclei by kneading the molten resin and carbon dioxide in only one extruder, thereby making it difficult to obtain an expanded product having numerous very small cells.

The present inventors proposed in Japanese Patent Laid-Open No. 11190/1996 a process for producing an expanded thermoplastic resin product evenly containing numerous very small cells by expansion extrusion, characterized in that the process comprises a gas dissolving step of impregnating a molten thermoplastic resin with an inert gas as a blowing agent in a first extruder and an adapter connected to the first extruder and having a mixing portion, a cooling step of lowering the temperature of the molten resin in a second extruder while maintaining its pressurized state, a nucleus-producing step of producing numerous cell nuclei as a result of an abrupt drop in pressure, and an expansion controlling step of controlling the diameters of cells.

According to this production process, it is possible to continuously perform the production of expanded products whose production is practically extremely difficult by the production process disclosed in U.S. Pat. No. 4,473,665 or U.S. Pat. No. 5,158,986. It is however necessary for this production process to make the lip opening of a die extremely narrow to apply high shear force to molten resin during the nucleus-producing step. Accordingly, it is becoming increasingly clear that this production process is suitable for the production of a thin expanded product but is not adequate for the production of a relatively thick expanded product. It is to be noted that Japanese Patent Laid-Open No. 11190/1996 discloses only extrusion processes.

U.S. Pat. No. 5,158,986 also proposes a process for obtaining an expanded product by molding a thermoplastic resin in a cylinder of an injection molding machine, impregnating the thus-molten resin with supercritical carbon dioxide, and upon uniform dispersion of carbon dioxide, abruptly heating the thus-impregnated resin to form cell nuclei, and then injecting the molten resin into a mold which has been filled with a high-pressure gas to control expansion.

This process is however accompanied by drawbacks such as:

1) since the melting of the resin, the kneading of carbon dioxide and the injection are all conducted by the injection molding machine alone and further because metering of the resin is stopped upon injection, it is difficult to assure the supply of carbon dioxide, which is fed continuously, in a constant quantity and also to maintain constant the mixing ratio of the thermoplastic resin to carbon dioxide; and 2) as the screw back-pressure is no longer applied subsequent to the completion of metering insofar as a conventional injection molding machine is singly used, the thermoplastic resin and carbon dioxide in a mutually-dissolved state are separated from each other, thereby making it difficult to form very fine cells when they are injected into the mold.

These drawbacks have therefore led to a problem such that cells of a uniform and very small diameter can hardly be obtained in the case of a large molded product although an expanded product of very small cells is available insofar as the expanded product is a small molded product like specimens for the measurement of physical properties.

SUMMARY OF THE INVENTION

An object of the present invention is therefore to provide an injection-expansion molded, thermoplastic resin product comprising an expanded portion, which contains cells of a very small average cell diameter and a uniform cell population, and as a surface layer, an unexpanded portion having good surface appearance and integrated with said expanded portion. Another object of the present invention is to provide a process for the production of the expanded product by using carbon dioxide and/or nitrogen as a blowing agent.

The present inventors have proceeded with an extensive investigation with a view to providing an injection-expansion molded, thermoplastic resin product comprising an expanded portion, which contains cells of a very small average cell diameter and a uniform cell population, and as a surface layer, an unexpanded portion having good surface appearance and integrated with said expanded portion. As a result, it has been found that injection-expansion molded, thermoplastic resin products—each of which has as a surface layer an unexpanded portion having good surface appearance and integrated with an expanded portion—can be produced continuously in short times by connecting an injector, which is equipped with an injection plunger, to a continuous plasticator equipped with a feed line for a blowing agent, fully kneading a thermoplastic resin and an inert gas into a mutually-dissolved state, and then causing the resultant mixture to undergo an abrupt pressure reduction, leading to the present invention.

In one aspect of the present invention, there is accordingly provided an injection-expansion molded, thermoplastic resin product comprising an expanded portion as an inner layer and an unexpanded portion as a surface layer, said expanded portion having an average cell diameter of from 0.01 to 50 $\mu$m and an average cell population of from $10^8$ to $10^{16}$ cells/cm$^3$, and said unexpanded portion having a thickness of from 10 to 1,000 $\mu$m and integrated with the expanded portion.

In another aspect of the present invention, there is also provided a process for the production of an injection-expansion molded, thermoplastic resin product, which comprises:

(I) as a gas dissolving step, melting 100 parts by weight of a thermoplastic resin at 100 to 450° C. in a continuous plasticator (1) equipped with a feed line for a blowing agent, adding supercritical carbon dioxide and/or nitrogen in a proportion of 0.1 to 30 parts by weight per 100 parts by weight of the thermoplastic resin, and forming a molten resin composition in which the thermoplastic resin and the supercritical carbon dioxide and/or nitrogen are in a mutually-dissolved state, (II) as a cooling step, cooling, within the continuous plasticator (1), the molten resin composition to a temperature of from 50 to 300° C. while maintaining a pressure equal to or higher than a critical pressure of the carbon dioxide and/or nitrogen, (III) as a metering and injection step, metering the thus-cooled molten resin composition by an injector (7), which is connected to the continuous plasticator (1) and equipped with an injection plunger (6), and filling the same in a mold (8), and (IV) as an expansion controlling step, lowering an internal pressure of the mold (8) to a pressure lower than the critical pressure of the carbon dioxide and/or nitrogen to produce cell nuclei, whereby the cell diameter is controlled;

wherein the carbon dioxide and/or nitrogen are maintained in a supercritical state up to the metering and injection step, and the gas dissolving step and cooling step by the continuous plasticator (1) and the metering and injection step by the injector (7) are conducted independently.

BRIEF DESCRIPTION OF THE DRAWINGS

For a more complete understanding of this invention, reference may be had to the following detailed description with reference to the accompanying drawings in which.

DESCRIPTION OF THE PREFERRED EMBODIMENTS

Figure 1:
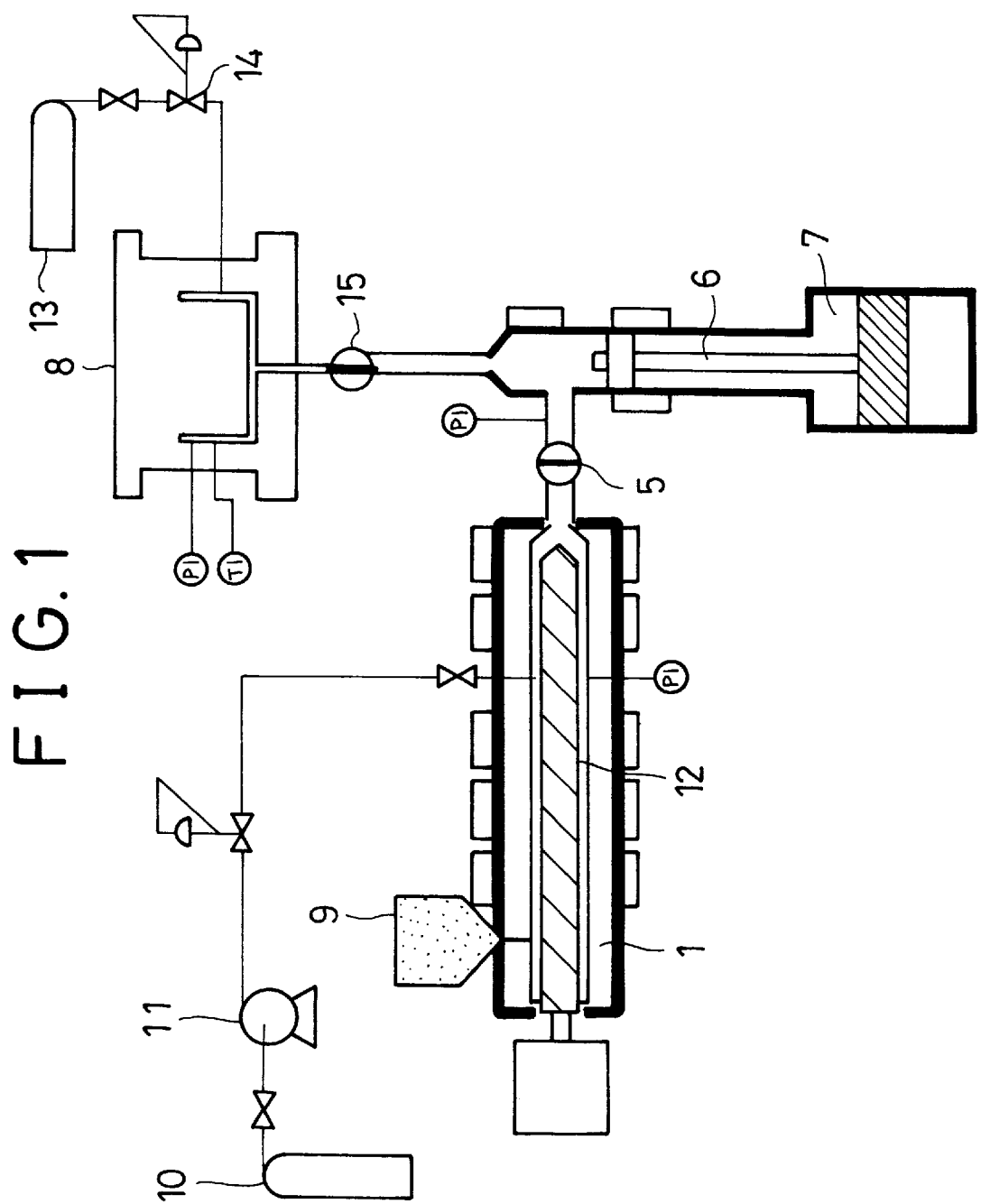
FIG. 1 is schematic construction diagram illustrating a process according to a first embodiment of the present invention for the production of an injection-expansion molded, thermoplastic resin product.

Described specifically, the present invention embraces therein the following embodiments:

(1) An injection-expansion molded, thermoplastic resin product comprising an expanded portion as an inner layer and an unexpanded portion as a surface layer, said expanded portion having an average cell diameter of from 0.01 to 50 $\mu$m and an average cell population of from $10^8$ to $10^{16}$ cells/cm$^3$, and said unexpanded portion having a thickness of from 10 to 1,000 $\mu$m and integrated with said expanded portion.

(2) The product described above under (1), wherein said average cell diameter ranges from 0.01 to 20 $\mu$m and said average cell population ranges from $10^8$ to $10^{16}$ cells/cm$^3$.

(3) A process for the production of the injection-expansion molded, thermoplastic resin product described above under (1) or (2), which comprises:

(I) as a gas dissolving step, melting 100 parts by weight of a thermoplastic resin at 100 to 450° C. in a continuous plasticator equipped with a feed line for a blowing agent, adding supercritical carbon dioxide and/or nitrogen in a proportion of 0.1 to 30 parts by weight per 100 parts by weight of said thermoplastic resin, and forming a molten resin composition in which said thermoplastic resin and said supercritical carbon dioxide and/or nitrogen are in a mutually-dissolved state, (II) as a cooling step, cooling, within said continuous plasticator, said molten resin composition to a temperature of from 50 to 300° C. while maintaining a pressure equal to or higher than a critical pressure of said carbon dioxide and/or nitrogen, (III) as a metering and injection step, metering the thus-cooled molten resin composition by an injector, which is connected to said continuous plasticator and equipped with an injection plunger, and filling the same in a mold, and (IV) as an expansion controlling step, lowering an internal pressure of said mold to a pressure lower than said critical pressure of said carbon dioxide and/or nitrogen to produce cell nuclei, whereby said cell diameter is controlled;

wherein said carbon dioxide and/or nitrogen are maintained in a supercritical state up to said metering and injection step, and said gas dissolving step and cooling step by said continuous plasticator and said metering and injection step by said injector are conducted independently.

(4) The process described above under (3), wherein between said continuous plasticator equipped with said feed line for said blowing agent and said injector equipped with said injection plunger, an adapter having a mixing portion is arranged so that said adapter is connected to a delivery path of said continuous plasticator, said delivery path being selectively connected to said injector via an on-off valve.

(5) The process described above under (3), wherein said process can produce an expanded product of 0.5 to 50 mm in thickness.

(6) The process described above under (3), wherein said process can produce an expanded product of 10 to 50 mm in thickness.

(7) The process described above under (3), wherein said expansion control step is conducted by removing a high-pressure gas, which has been filled in said mold subsequent to the injection of said molten resin composition, and/or causing at least a portion of a core of said mold to retreat.

(8) The process described above under (3), wherein a foam stabilizer is added further in a proportion of from 0.1 to 10 parts by weight to said thermoplastic resin.

(9) The process described above under (3), wherein between said continuous plasticator equipped with said feed line for said blowing agent and said injector equipped with said injection plunger, a resin accumulator equipped with a plunger is arranged so that said resin accumulator is selectively connected to said injector via an on-off valve.

(10) The process described above under (9), wherein between an adapter having a mixing portion and said injector equipped with said injection plunger, said resin accumulator equipped with said plunger is arranged so that said resin accumulator is selectively connected to said injector via said on-off valve.

This application is based on applications Nos. 82493/1996, 339702/1996 and 71644/1997 filed Apr. 4, 1996, Dec. 19, 1996 and Mar. 25, 1997 in Japan, respectively, the contents of which are incorporated herein by reference.

The present inventors conducted the investigation for the achievement of the above-described objects. A description will be made about the apparatus of FIG. 1 and the process, which were designed for the present invention. To a continuous plasticator 1 equipped with a feed line for a blowing agent, an injector 7 equipped with an injection plunger 6 is connected via an on-off valve 5. A resin is transferred into the continuous plasticator 1 and, while heating and melting the resin, carbon dioxide and/or nitrogen in a supercritical state is introduced, whereby a mutually-dissolved molten resin composition is formed.

The molten resin composition is then transferred to the injector 7 equipped with the injection plunger 6. Subsequent to the transfer, the on-off valve 5 is closed so that the continuous plasticator 1 and the injector 7 are isolated from each other. The continuous plasticator 1 continuously forms the molten resin composition without interruption even while the injector 7 is performing metering and injection. Since the molten resin composition is not metered to the injector 7 during the metering and injection by the injector 7, the pressure within the continuous plasticator 1 rises. Because the mutually-dissolved state of the molten resin composition is not destroyed by the rise in the pressure, no problems arise by the continuation of the gas dissolving step and cooling step. If any problem is however expected to arise in view of the pressure resistance of the continuous plasticator 1, the apparatus can be modified without departing from the principle of the present invention in such a way that the molten resin composition can be discharged out of the system by operating the on-off valve 5.

On the other hand, the injector 7 performs injection after completion of the metering. In the conventional injection molding machine shown in FIG. 5, a back-pressure is once eliminated after the completion of the metering. In the present invention, however, a back-pressure higher than a critical pressure of the blowing agent is always applied from the beginning of metering until the end of-the metering. The molten resin composition formed in the continuous plasticator 1 is therefore injected into the mold 8 without phase separation between the blowing agent and the resin.

Within the mold 8, the expansion controlling step is conducted by removing a high-pressure gas which has been filled in the mold 8 subsequent to the injection of the molten resin composition or by causing a portion or the entire portion of a core to retreat. A portion of the thus-injected resin, said portion being brought into contact with the mold 8, is cooled at this time so that as a dense unexpanded layer substantially free of cells greater than 1 $\mu$m, the portion is formed integrally with a surface portion of an expanded product. A cross-section of the injection-expansion product therefore has a structure such as that depicted in FIG. 7.

Figure 2:
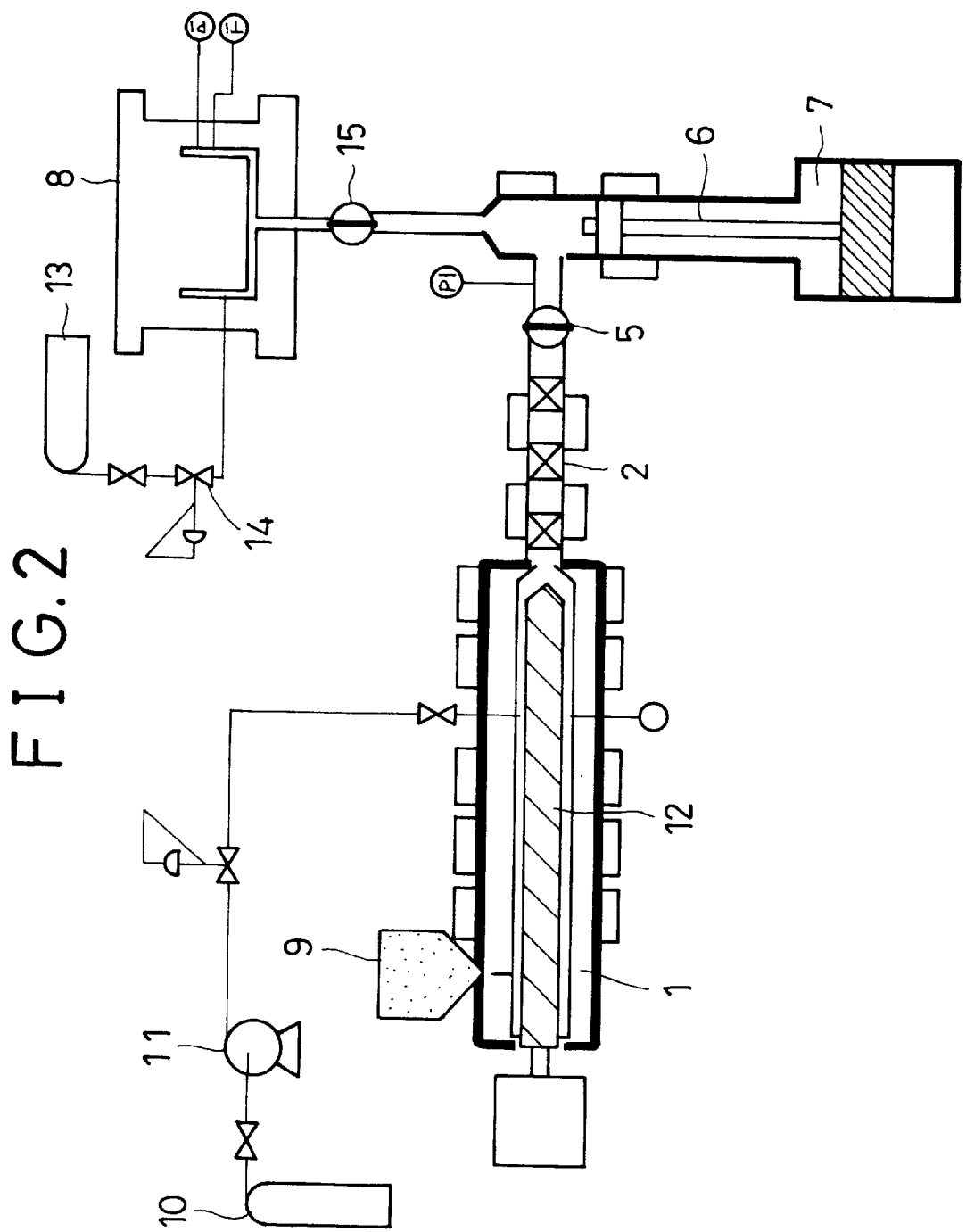
FIG. 2 is schematic construction diagram illustrating a process according to a second embodiment of the present invention for the production of an injection-expansion molded, thermoplastic resin product.

The process according to the second embodiment of the present invention is shown in FIG. 2. Between the continuous plasticator 1 equipped with the feed line for the blowing agent and the injector 7 equipped with the injection plunger 6, an adapter 2 having a mixing portion is arranged so that the adapter 2 is connected to a delivery path of the continuous plasticator 1, said delivery path being connected to the injector 7 via the on-off valve 5. The arrangement of the adapter 2 can further promote the mixing between the molten thermoplastic resin and the carbon dioxide and/or nitrogen to facilitate the formation of the thermoplastic resin and the carbon dioxide and/or nitrogen into a mutually-dissolved state. Further, temperature control by the adapter 2 can facilitate to cool the resin, which is in the molten state, so that the resin has a viscosity suited for the subsequent injection and expansion. No particular limitation is imposed on the adapter 2 having the mixing portion, but an adapter with a built-in static mixer can be suitably employed because the resin is subjected to kneading and cooling there.

Figure 3:
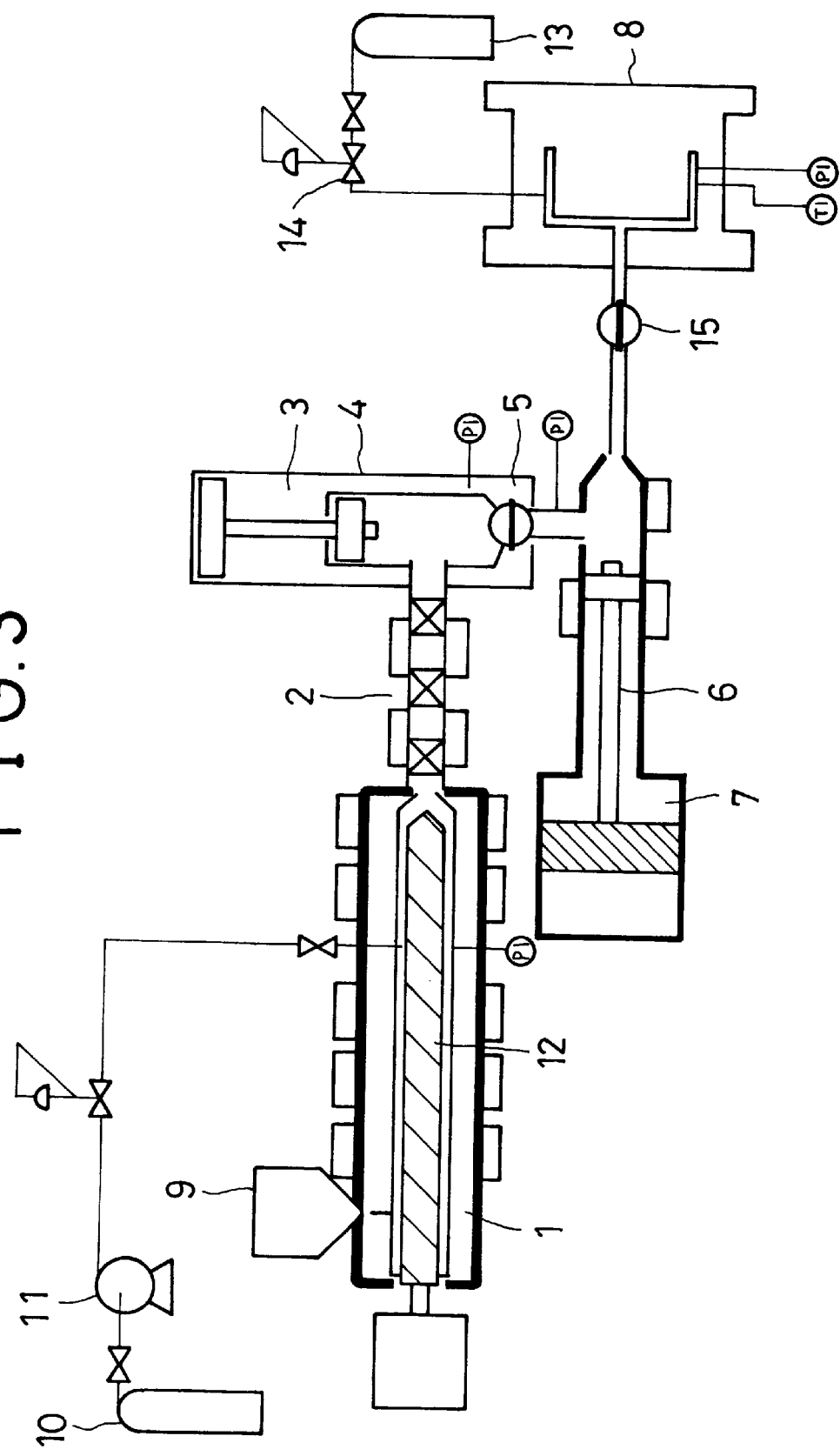
FIG. 3 is schematic construction diagram illustrating a process according to a third embodiment of the present invention for the production of an injection-expansion molded, thermoplastic resin product.

With reference to FIG. 3, the third embodiment of the present invention will be described. Before the injector 7 equipped with the injection plunger 6, a resin accumulator 4 equipped with a plunger is arranged so that the resin accumulator 4 is connected to the injector 7 via the on-off valve 5. After the on-off valve 5 has been turned off subsequent to completion of metering and while injection into a mold 8 is being performed by the injection plunger 6, the molten resin fed from the continuous plasticizer 1 is fed to the resin accumulator 4 arranged immediately before the on-off valve 5. Due to the flow-in of the molten resin, the plunger of the resin accumulator 4 is caused to retreat. This control by the resin accumulator 4 makes it easier to maintain the interior of the apparatus system under a predetermined pressure. This in turn facilitates the maintenance of the molten resin composition in a mutually-dissolved state, thereby making it easier to form an expansion-injection molded product with very small cell diameters. The arrangement of the resin accumulator 4 is therefore preferred.

The fourth embodiment of the present invention will next be described with reference to FIG. 4. It is possible to arrange one more injector 7, which is also equipped with an injection plunger 6, in place of the resin accumulator 4 equipped with the plunger. This makes it easier to maintain the interior of the apparatus system under a predetermined pressure. This in turn facilitates the maintenance of the molten resin composition in a mutually-dissolved state, thereby making it easier to form an expansion-injection molded product with very small cell diameters. The arrangement of the additional injector 7 equipped with the injection plunger 6 is therefore preferred.

No particular limitation is imposed on the thermoplastic resin usable in the present invention insofar as its plasticizing temperature falls within a range of from 100 to 450° C. Illustrative of the thermoplastic resin are styrene resins (for example, polystyrene, butadiene-styrene copolymer, acrylonitrile-styrene copolymer, acrylonitrile-butadiene-styrene copolymer, etc.), ABS resin, polyethylene, polypropylene, ethylene-propylene resin, ethylene-ethyl acrylate resin, polyvinyl chloride, polyvinylidene chloride, polybutene, polycarbonates, polyacetals, polyphenylene oxide, polyvinyl alcohol, polymethyl methacrylate, saturated polyester resins (for example, polyethylene terephthalate, polybutylene terephthalate, etc.), biodegradable polyesters (for example, hydroxycarboxylic condensation products such as polylactic acid, diol-dicarboxylic acid condensation products such as polybutylene succinate, etc.), polyamide resins, polyimide resins, fluorinated resins, polysulfones, polyethersulfones, polyarylates, polyetheretherketones, liquid crystal polymers. They can be used either singly or in combination. Among these thermoplastic resins, styrene-base resins and polyolefin-based resins are preferred, with polystyrene and polypropylene being particularly preferred.

Further, the melt flow index of each thermoplastic resin as measured around its processing temperature may desirably fall within a range of from 0.05 to 60 g/10 minutes, preferably from 0.1 to 40 g/10 minutes, more preferably from 0.2 to 20 g10 minutes or so. In this case, the measuring conditions, namely, the measuring temperature and load can be set using the conditions specified under the ASTM as indexes. For example, the measuring temperature and load can be set at 230° C. and 2,16 kgf/cm$^2$ for polypropylene and at 200° C. and 5.0 kgf/cm$^2$ for polystyrene. The other conditions can be set following the corresponding conditions prescribed under ASTM D1238.

A melt flow index around the lower limit of the above range or higher provides an adequate resin viscosity upon melting so that no excessive load is applied to an extruder and the processing is facilitated. On the other hand, a melt flow index around the upper limit of the above range or lower allows the resin to withstand a gas pressure during expansion and also to retain viscosity so that very small cells can be formed without development of cell collapse. In accordance with these indexes, a melt index can be suitably chosen for a resin to be used.

Use of a resin having a melt flow index of from 10 to 60 g/10 minutes, such as polypropylene or polystyrene, as a thermoplastic resin makes it easier to obtain a product of a high expansion ratio. On the other hand, use of a resin having a melt flow index of from 0.05 to 10 g/10 minutes makes it possible to shorten a cooling time due to its fast cooling and hardening, thereby bringing about an improvement in productivity as an advantageous effect.

Concerning the amount of supercritical carbon dioxide and/or nitrogen used as a blowing agent in the present invention, it is desired to use the blowing agent in a proportion of from 0.1 to 30 parts by weight, more preferably from 0.2 to 20 parts by weight per 100 parts by weight of the thermoplastic resin composition.

If the proportion of the blowing agent is smaller than 0.1 part by weight, no very small average cell diameter can be obtained. A proportion greater than 30 parts by weight results in an expanded product with a surface of blister-like defective external appearance, thereby making it difficult to obtain an attractive surface appearance.

Although supercritical carbon dioxide and nitrogen as blowing agents can be used singly, they can also be used in combination. When used in combination, their mixing ratio may preferably range from 1:9 to 9:1. When the thermoplastic resin of the expanded product is a polyester resin such as PET, PBT or polylactic acid, a polycarbonate, a polyamide or the like, it is more preferred to use carbon dioxide and nitrogen in combination rather than using carbon dioxide alone as a blowing agent because the combined use permits an easier reduction in cell size and easier formation of cells at a higher population.

Examples of a method for mixing the blowing agent in the melt of the resin composition within the injection molding machine include injection of gaseous carbon dioxide and/or nitrogen as is or in a pressurized state and injection of liquefied carbon dioxide and/or nitrogen by a plunger pump or the like.

These carbon dioxide and/or nitrogen is required to be in a supercritical state within the molding machine in view of its solubility, penetrability, diffusibility and the like in the molten resin composition.

The present invention also permits combined use of a blowing agent of the thermal decomposition type as an expansion nucleating agent. The blowing agent gives off carbon dioxide or nitrogen upon thermal decomposition. Examples include azodicarbonamide, N,N-dinitrosopentatetramine, azobisisobutyronitrile, citric acid, and sodium hydrogencarbonate.

To make cell diameters very small, it is also possible to add one or more of various foam stabilizers to the thermoplastic resin to be employed in the present invention. As such foam stabilizers, conventionally known foam stabilizers used in ordinary expansion molding can be used. Suitable usable examples include organopolysiloxanes and fluoroalkane esters of aliphatic hydrocarbons.

Illustrative of such organopolysiloxanes are polydimethylsiloxane, polydiphenylsiloxane, polymethylphenylsiloxane, and polymethylhydrogensiloxane; and modified organopolysiloxanes obtained by modifying these organopolysiloxanes with epoxy-containing compounds, amino-containing compounds, ester-bond-containing compounds or the like. Among these, polydimethylsiloxane is preferred from the viewpoints of the dispersibility and solubility in the resin and effects or the like in improving the surface appearance.

When a modified organopolysiloxane is used, combined addition of a radical-producing agent such as a peroxide makes it possible to improve the miscibility of the modified organopolysiloxane with the resin.

Examples of the fluoroalkane esters of aliphatic carboxylic acids include esters between aliphatic carboxylic acids having 3–30 carbon atoms and fluoroalkanes containing fluoroalkane groups derived from alkyl groups having 3–30 carbon atoms. Suitable examples of the aliphatic carboxylic acids include lauric acid, stearic acid, crotonic acid, oleic acid, maleic acid, glutaric acid, and montanic acid. From the view-points of the dispersibility and solubility in the resin and effects or the like in improving the surface appearance, fluoroalkane esters of montanic acid are preferred. Of these, perfluoroalkane esters of montanic acid are particularly preferred.

The desired proportion of such a foam stabilizer may range from 0.1 to 10 parts by weight, preferably from 0.2 to 8 parts by weight, more preferably from 0.3 to 5 parts by weight.

Addition of the cell stabilizer in a proportion of 0.1 wt. % or greater facilitates the production of an expanded product with smaller cells. A proportion of 10 parts by weight or smaller allows the resin to retain a viscosity sufficient to withstand a gas pressure during expansion and hence to form smaller cells without collapse.

As an additive to the thermoplastic resin composition, the present invention also permits use of fine inorganic powder which acts as an expansion nucleating agent. Examples of the fine inorganic powder include talc, calcium carbonate, clay, magnesium oxide, zinc oxide, glass beads, glass powder, titanium oxide, carbon black, and anhydrous silica. Among these, talc, calcium carbonate, titanium oxide and anhydrous silica are preferred, with talc being particularly preferred. Their particle sizes are preferably 50 $\mu$m or smaller, more preferably 10 $\mu$m or smaller, notably 5 $\mu$m or smaller.

To the extent not impairing the characteristic properties of the present invention, the above-described resin composition can be combined with additives or the like, which are other than the fine inorganic powder, aliphatic carboxylic acid and derivatives thereof exemplified above, as needed depending on the purpose and application field. These other additives and the like include various elastomers such as ethylene-propylene rubber, ethylene-butene rubber, propylene-butene rubber, hydrogenation products of styrene-butadiene block copolymers, hydrogenation products of styrene-isoprene diblock copolymers, hydrogenation products of styrene-isoprene-styrene triblock copolymers, low-density polyethylene, high-density polyethylene, linear low-density polyethylene, ultralow-density polyethylene, ethylene-ethyl acrylate copolymers, ethylene-vinyl acetate copolymers and polybutene; plasticizers; pigments; stabilizers; fillers; and metal powders.

No particular limitation is imposed on the production method of the thermoplastic resin composition which is used as a raw material for the injection-expansion molded, thermoplastic resin product according to the present invention, and a conventionally known method can be adopted. The thermoplastic resin composition can be prepared, for example, by forming the thermoplastic resin and, if necessary, an additive such as an organopolysiloxane or a fluoroalkane ester of a fatty carboxylic acid can be prepared into an intimate mixture with a high-speed stirrer or the like and then melting and kneading the resultant mixture with a single screw or multi-screw extruder, mixing roll, kneader, Brabender mixer or the like which has sufficient kneading ability. As an alternative, the thermoplastic resin and the organopolysiloxane or the fluoroalkane ester of the aliphatic carboxylic acid can also be used in an intimately mixed state without inconvenience.

The gas dissolving step in the present invention, in which the thermoplastic resin composition and carbon dioxide and/or nitrogen are formed into a mutually dissolved state, is a step in which in the production process shown in FIG. 1 for the injection-expansion molded, thermoplastic resin product, the resin composition is heated and rendered molten in the continuous plasticator 1, the carbon dioxide and/or nitrogen is added in a supercritical state to the thus-molten resin composition, and the resultant mixture is then formed into a uniform mixture. The cooling step is a step in which the resin composition in the molten state is cooled to adjust its viscosity to a level suited for injection and expansion.

The gas dissolving step and cooling step is conducted in the continuous plasticator 1 and the adapter 2 in the production process shown in FIG. 2 for the injection-expansion molded, thermoplastic resin product. Further, in the production process illustrated in FIG. 3 for the injection-expansion molded, thermoplastic resin product, they are conducted in the continuous plasticator 1, the adapter 2 and the resin accumulator 4.

The metering and injection step is a step in which the resin composition, whose temperature has been controlled to give a viscosity suited for injection and expansion, is metered to the injector 7 and is then injected by the injection plunger 6. The expansion controlling step is a step in which the resin composition, which has been injected into the mold 8, is depressurized from a pressurized state to form cell nuclei and hence to control the size of the cell diameter. Of these steps, at least the gas dissolving step and the cooling step are conducted following the methods disclosed in Japanese Patent Laid-Open No. 11190/1996 as will be described below. These steps are described in Japanese Patent Laid-Open No. 11190/1996, the contents of which are incorporated herein by reference.

A thermoplastic resin is fed from a hopper 9 into the continuous plasticator 1 and is heated and rendered molten at 100 to 450° C. On the other hand, carbon dioxide and/or nitrogen is allowed to flow from a gas cylinder 10 to a compressor pump 11, where the carbon dioxide and/or nitrogen is compressed. The pressure-controlled carbon dioxide and/or nitrogen is then fed into the molten resin composition within the continuous plasticator 1. At this time, the interior of the system is maintained above the critical pressure and critical temperature of the carbon dioxide and/or nitrogen contained in the continuous plasticator 1 so that the dissolution and diffusion of the carbon dioxide and/or nitrogen into the resin composition are substantially increased to permit its penetration into the resin composition in a short time. Further, the carbon dioxide and/or nitrogen fed into the continuous plasticator 1 is raised in temperature and pressure and is hence brought into a supercritical state, or before being fed to the continuous plasticator 1, it is raised in temperature and pressure into a supercritical state and is then fed to the continuous plasticator 1.

In the continuous plasticator 1, the molten resin composition and the carbon dioxide and/or nitrogen are kneaded by a screw 12 so that the thermoplastic resin composition and the carbon dioxide and/or nitrogen are formed into a mutually-dissolved state. After the mutual dissolution, the cooling step is conducted. By controlling the temperature of a free end portion of the continuous plasticator 1, the resin composition in the molten state is cooled to a temperature of from 50 to 300° C., preferably from 80 to 280° C. and equal to or higher than the plasticizing temperature of the molten resin composition so that the viscosity of the resin composition is adjusted to a level suited for subsequent injection and expansion.

The first to fourth embodiments of the present invention will hereinafter be described with reference to the accompanying drawings. In FIGS. 1 through 4, there are shown the continuous plasticator 1, the adapter 2, the resin accumulator plunger 3, the resin accumulator 4, the on-off valve 5, the injection plunger 6, the injector 7, the mold 8, the hopper 9, the gas cylinder 10, the compressor pump 11, the screw 12, a gas cylinder 13, a pressure regulating valve 14, and an on-off valve 15.

Reference is now had to FIG. 1. In the gas dissolving step, 100 parts by weight of a thermoplastic resin are fed into the continuous plasticator 1 from the hopper 9 and are heated and rendered molten. On the other hand, 0.1 to 30 parts by weight of carbon dioxide and/or nitrogen is allowed to flow from the gas cylinder 10 to the compressor pump 11, where the carbon dioxide and/or nitrogen is compressed. The pressure-controlled carbon dioxide and/or nitrogen is then fed into the molten resin composition within the continuous plasticator 1 to perform the gas dissolving step. At this time, it is necessary to maintain the interior of the system above the critical pressure and critical temperature of the carbon dioxide and/or nitrogen contained in the continuous plasticator 1 so that the dissolution and diffusion of the carbon dioxide and/or nitrogen into the resin composition are substantially increased to permit its penetration into the resin composition in a short time. For example, the critical pressure and critical temperature are 75.3 kg/cm$^2$ and 31.35° C. in the case of carbon dioxide, whereas the critical pressure and critical temperature are 33.5 kg/cm$^2$ and −147.0° C. in the case of nitrogen. Inside the continuous plasticator 1, the pressure can be in a range of from 75 to 400 kg/cm$^2$, preferably from 100 to 300 kg/cm$^2$ and the temperature can be in a range of from 100 to 450° C., preferably from 110 to 280° C.

Further, the carbon dioxide and/or nitrogen fed into the continuous plasticator 1 is raised in temperature and pressure and is hence brought into a supercritical state, or before being fed to the continuous plasticator 1, it can be raised in temperature and pressure into a supercritical state and can then be fed to the continuous plasticator 1.

In the continuous plasticator 1, the molten resin composition and the carbon dioxide and/or nitrogen are kneaded by the screw 12 so that the thermoplastic resin composition and the carbon dioxide and/or nitrogen are formed into a mutually-dissolved state. After the mutual dissolution, the cooling step is conducted. By controlling the temperature of the free end portion of the continuous plasticator 1, the resin composition in the molten state is cooled to a temperature of from 50 to 300° C., preferably from 80 to 280° C. and equal to or higher than the plasticizing temperature of the molten resin composition so that the viscosity of the resin composition is adjusted to a level suited for the subsequent injection and expansion.

In the metering and injection step, the molten resin composition, whose temperature has been controlled to have a viscosity suited for injection and expansion, is fed to the injector 7 connected via the on-off valve 5 and equipped with the injection plunger 6. When the on-off valve 5 is open, the molten resin composition flows into the injector 7 to cause the injection plunger 6 to retreat so that metering is effected. In a conventional injection molding machine, a back-pressure becomes no longer applied immediately after the completion of the metering. In the present invention, it is however necessary to continue the application of a back-pressure and the control of the internal pressure of the system until the end of injection so that the molten resin composition is prevented from expansion within the injector 7 during this time. The back-pressure during this time is required to be equal to or higher than the critical pressure of carbon dioxide and/or nitrogen. Until the series of steps, that is, the gas dissolving step, the cooling step and the metering and injection step are completed, it is necessary to always maintain a pressure equal to or higher than the critical pressure of the blowing agent so that the molten resin composition is prevented from separating into the resin and the gas. Once the resin and the gas separate, the resin and the gas can no longer be formed into a mutually-dissolved state even if the pressure inside the system is raised again. It therefore becomes impossible to form very small cells.

After the completion of the metering, the on-off valve 5 is turned off and injection of the mutually-dissolved mixture of the resin and the gas into the mold 8 is then conducted by the injection plunger 6. By sucking back the injection plunger 6 prior to performing the injection subsequent to the metering, the internal pressure of the injector 7 can be slightly lowered to induce the formation of cell nuclei. This method can also be employed suitably.

While the injection of the mutually-dissolved mixture of the resin and the gas into the mold 8 is being performed by the injection plunger 6 subsequent to the change-over of the on-off valve 5 into the closed position, the continuous plasticator 1 performs the melting of the resin composition and the feeding and kneading of the carbon dioxide independently from the injection step. This makes it possible to continue the mixing and dissolution of carbon dioxide in a constant amount in the thermoplastic resin so that the interior of the continuous plasticator 1 can always be maintained at a pressure equal to or higher than the critical pressure of the blowing agent. When the on-off valve 5 is changed over into the open position subsequent to the completion of the metering and injection step, the cooled molten resin composition is immediately fed from the continuous plasticator 1 into the injector 7 and the metering step is initiated.

Incidentally, to produce an expanded product containing cells of a very small average cell diameter and a uniform average cell population, it is necessary to maintain carbon dioxide and/or nitrogen in a super-critical state throughout at least the gas dissolving step, the cooling step, and the metering and injection step.

Into the mold 8 shortly before the injection, a high-pressure gas which has been fed from the gas cylinder 13 or a compressor pump via the pressure control valve 14 is filled to a predetermined pressure. For example, when nitrogen is used as a high-pressure gas, its pressure can preferably be equal to or higher than the critical pressure of carbon dioxide and/or nitrogen employed as a blowing agent.

In the expansion controlling step, the molten resin composition of the thermoplastic resin composition and the carbon dioxide and/or nitrogen in the mutually-dissolved state is injected into the mold 8 filled with the high-pressure gas. After the injection, the high-pressure gas as filled in the mold 8 is rapidly released so that an abrupt pressure drop takes place inside the mold 8. By this step, the gas with which the resin is impregnated is brought into an oversaturated state, whereby numerous cell nuclei are formed.

The cell diameter can be controlled by the temperature of the mold 8, the internal pressure of the mold 8, and the pressure-lowering rate, thereby obtaining an injection-expansion molded, thermoplastic resin product having an average cell diameter of from 0.01 to 50 $\mu$m, preferably from 0.01 to 20 $\mu$m, more preferably from 0.1 to 20 $\mu$m, most preferably from 1 to 20 $\mu$m and an average cell population of from $10^8$ to $10^{16}$ cells/cm$^3$, preferably from $10^8$ to $10^{14}$ cells/cm$^3$, more preferably from $10^8$ to $10^{12}$ cells/cm$^3$ and having, as a surface layer, a 10 to 1000 $\mu$m thick, unexpanded portion substantially free of cells of 1 $\mu$m or greater.

As a method for developing an abrupt pressure drop inside the mold 8, there is also a suitably usable method in which the molten resin composition of the thermoplastic resin composition and the carbon dioxide and/or nitrogen in the mutually-dissolved state is injected into the mold 8, a portion or the entire portion of a core is caused to retreat, and the internal capacity of the mold 8 is hence abruptly increased to develop an abrupt pressure drop within the mold 8.

Although these expansion controlling methods can each bring about sufficient expansion controlling effects, no problem or inconvenience arises from using the two processes in combination.

As is shown in FIG. 2, the adapter 2 having the mixing portion is arranged between the continuous plasticator 1 equipped with the feed line for the blowing agent and the injector 7 equipped with the injection plunger 6 so that the adapter 2 is connected to the delivery path of the continuous plasticator 1, said delivery path being connected to the injector 7 via the on-off valve 5. The arrangement of the adapter 2 can further promote the mixing between the molten thermoplastic resin and the carbon dioxide and/or nitrogen to facilitate the formation of the thermoplastic resin and the carbon dioxide and/or nitrogen into a mutually-dissolved state. Further, temperature control by the adapter 2 can facilitate cooling of the resin, which is in the molten state, so that the resin has a viscosity suited for the subsequent injection and expansion and the gas dissolving step and the cooling step can be conducted with ease. No particular limitation is imposed on the adapter 2 having the mixing portion, but an adapter with a built-in static mixer can be suitably employed because the resin is subjected to kneading and cooling there.

As is illustrated in FIG. 3, the resin accumulator 4 equipped with a plunger is arranged before the injector 7 equipped with the injection plunger 6, so that the resin accumulator 4 is connected to the injector 7 via the on-off valve 5. After the on-off valve 5 has been turned off subsequent to completion of metering and while injection into the mold 8 is being performed by the injection plunger 6, the molten resin fed from the continuous plasticizer 1 is fed to the resin accumulator 4 arranged immediately before the on-off valve 5. Due to the flow-in of the molten resin, the plunger of the resin accumulator 4 is caused to retreat. This control by the resin accumulator 4 makes it easier to maintain the interior of the apparatus system under a predetermined pressure. This in turn facilitates the maintenance of the molten resin composition in a mutually-dissolved state, thereby making it easier to form an expansion-injection molded product with very small cell diameters. The arrangement of the resin accumulator 4 is therefore preferred.

Figure 4:
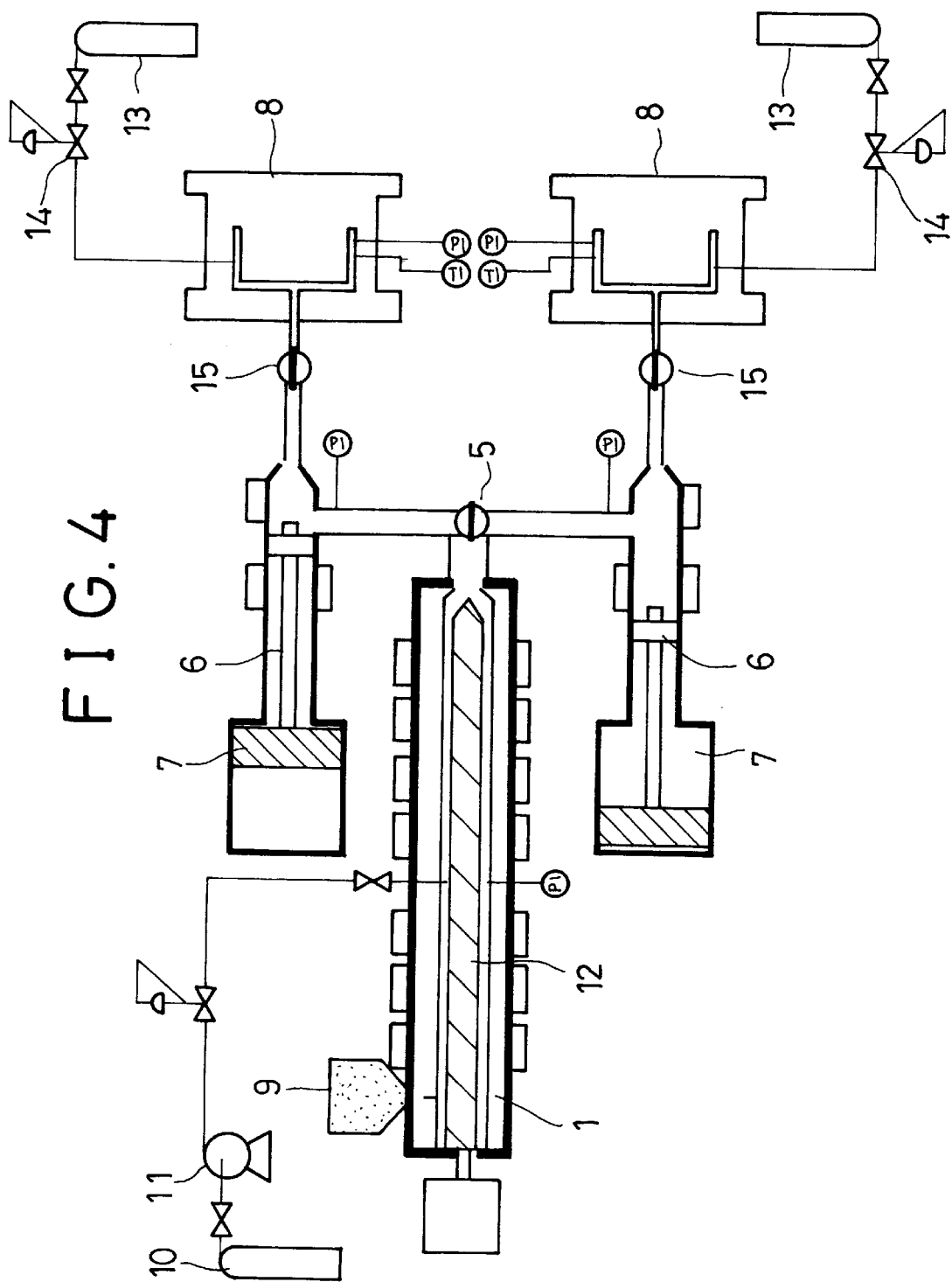
FIG. 4 is schematic construction diagram illustrating a process according to a fourth embodiment of the present invention for the production of an injection-expansion molded, thermoplastic resin product.

As is depicted in FIG. 4, it is possible to arrange the additional injector 7, which is also equipped with the injection plunger 6, in place of the resin accumulator 4 equipped with the plunger. This makes it easier to maintain the interior of the apparatus system under a predetermined pressure. This in turn facilitates the maintenance of the molten resin composition in a mutually-dissolved state, thereby making it easier to form an expansion-injection molded product with very small cell diameters. The arrangement of the additional injector 7 equipped with the injection plunger 6 is therefore preferred.

According to the process of the present invention, carbon dioxide and/or nitrogen as a blowing agent is fed to a molten resin in the continuous plasticator 1. After the blowing agent and the molten resin are fully kneaded, the resultant mixture is metered via the on-off valve 5 into the injector 7 having the injection plunger 6, followed by injection molding. The on-off valve 5 is changed over into a closed position even during the injection, so that the continuous plasticator 1 can perform the melting of the resin and the feeding and kneading of carbon dioxide independently of the injection step. This facilitates control of the internal pressure of the system, thereby making it easier to obtain an injection-expansion molded product having a smaller cell diameter. It is therefore possible to continuously produce in short times injection-expansion molded, thermoplastic resin products having numerous small cells uniformly.

The present invention has made it possible to efficiently produce an injection-expansion molded, thermoplastic resin product having an unexpanded portion which as a surface layer, has good surface appearance and is integrated.

Figure 7:
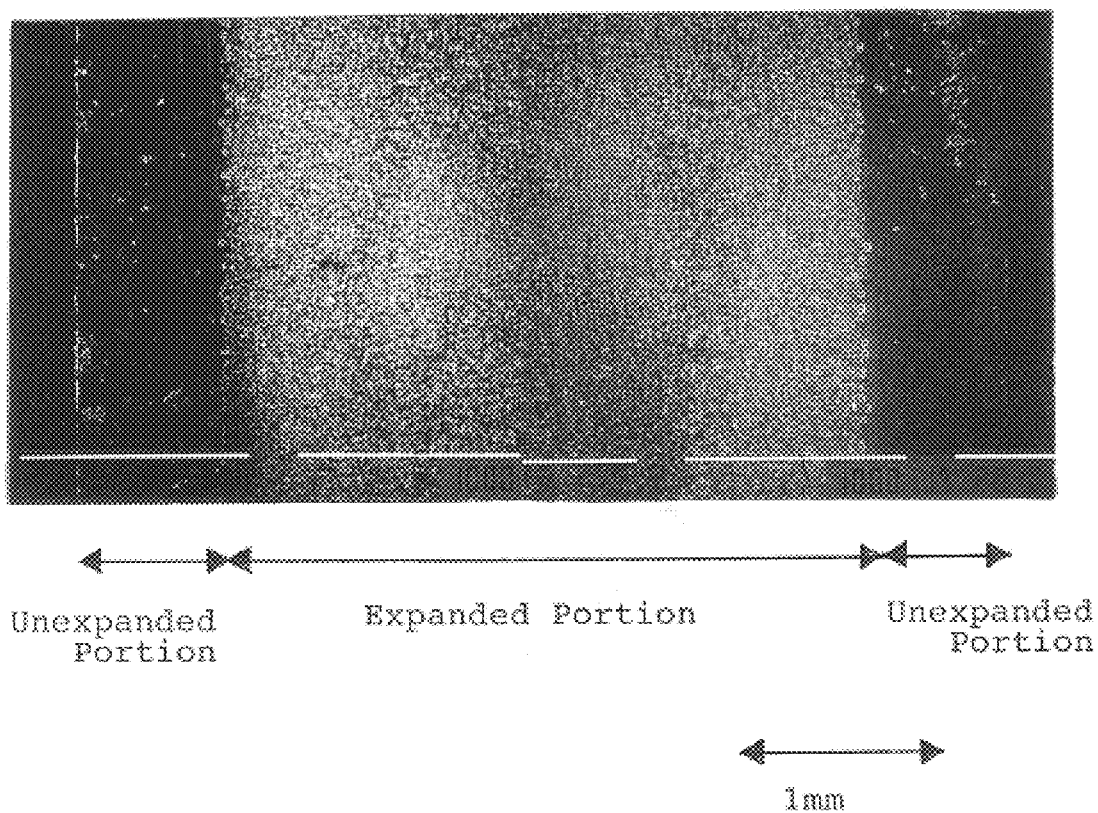
FIG. 7 is an illustrative cross-sectional photograph of an injection-expansion molded, thermoplastic resin product according to the present invention.

One example of a cross-sectional photograph of an injection-expansion molded, thermoplastic resin product is shown in FIG. 7. The molded product has the structure that unexpanded portions are integrated as surface layers with an expanded inner layer portion. The thickness of each unexpanded portion as the surface layer ranges from about 10 to about 1,000 $\mu$m. These unexpanded portions have been formed as a result of cooling of a molten resin composition, which has been introduced into a mold by injection, by its contact with the mold. The thickness of the expanded product is from 0.5 to 50 mm, preferably from 1 to 40 mm, more preferably from 2 to 30 mm. According to the present invention, an injection-expansion molded product of a desired thickness can be obtained by adjusting in advance the thickness of a mold cavity into which the molten resin composition is injected. It is therefore possible to easily produce an expanded product of 10 mm or greater or 15 mm or greater although extrusion-expansion molding is difficult to produce such a thick expanded product.

The present invention will hereinafter be described by the Examples to be described subsequently herein. It is however to be noted that the contents of the present invention are not limited to the Examples to be described subsequently herein.

Incidentally, the evaluations of physical properties described in the Examples and Comparative Examples were conducted following the following methods, respectively.

1) Surface Appearance

When a surface of an expanded product, which had been molded by setting the cooling time in the mold 8 at 60 seconds upon injection molding, was found to be uniform by visual observation and to contain integrated unexpanded portions as surface layer portions upon observation of the expanded product at a cross-section thereof, the expanded product was rated "A". In a case other than "A" such as inclusion of a blister-like swell, the expanded product was rated "B".

2) Average Cell Diameter

An equivalent circle diameter of cells as determined by subjecting to image processing a photograph taken by a scanning electron microscope was recorded as an average diameter of the cells.

3) Average Cell Population

Injection-expansion molded, thermoplastic resin products were continuously molded, and three specimens were collected every 10 molded products. Photographs of three specimens were taken by a scanning electron microscope and were then subjected to image processing. From the number of cells in a 500 $\mu$m square area, the number of cells per $cm^2$ was calculated. A value obtained by raising the number of cells to the $\frac{3}{2}$th power was obtained as a cell population. An average of the cell populations of the three specimens was recorded as an average cell population.

4) Uniformity of Cells

The uniformity of cells in an expanded product was rated "A" when the diameter of a largest cell in a 500 $\mu$m square area of a photograph taken by a scanning electron microscope was not greater than 1.5 times the average cell diameter and the cell populations of the three specimens so measured were within $\frac{2}{3}$ to 1.5 times the average cell population. The uniformity of cells in the expanded product was rated "B" when the diameter of the largest cell was not greater than 2 times the average cell diameter and the cell densities of the measured three specimens were within $\frac{1}{2}$ to 2 times the average cell density. Otherwise, the uniformity of the expanded product was rated "C".

5) Surface Layer Thickness

From a cross-sectional photograph of an expanded product as measured by a scanning electron microscope, the thicknesses of unexpanded surface layer portions were measured.

6) Izod Impact Strength

A dumbbell molded in each of the Examples and Comparative Examples was cut to prepare a No. 2A notched Izod impact test specimen of 2 mm in width and 4 mm in thickness. An Izod impact test was then conducted to measure its strength ratio to an unexpanded specimen of the same shape. Incidentally, the Izod impact strengths of unexpanded specimens of polystyrenes to be compared in strength were 1.76 kg-cm/$cm^2$ in the case of "TOPOREX 555-57" (trade name; product of Mitsui-Toatsu Chemicals Inc.), 1.54 kg-cm/$cm^2$ in the case of "TOPOREX 525-51" (trade name; product of Mitsui-Toatsu Chemicals Inc.), and 1.83 kg-cm/$cm^2$ in the case of "TOPOREX 575-57" (trade name; product of Mitsui-Toatsu Chemicals Inc.).

EXAMPLE 1

From a hopper 9, 100 parts by weight of pellets of a polystyrene resin having a melt flow index of 2.6 g/10 minutes at 200° C. under 5 kg ("TOPOREX 555-57", trade name; product of Mitsui-Toatsu Chemicals Inc.) were fed into a continuous plasticator 1 having a bore diameter of 30 mm and equipped with a screw 12 having an L/D ratio of 30. The resin was heated and rendered molten at 230° C. Upon complete melting of the resin, 15 parts by weight of carbon dioxide were fed after compressing it to 180 kg/$cm^2$, i.e., into a supercritical state by the compressor pump 11. The carbon dioxide and the molten resin were kneaded together and dissolved with each other in the continuous plasticator 1. The resin temperature of the molten resin composition was gradually cooled to 150° C. After metering the thus-cooled molten resin composition into an injector 7 controlled at 150° C., the molten resin composition was injected into a mold 8 whose temperature was set at 50° C. At this time, the mold 8 immediately before the injection was filled with nitrogen gas under a pressure of 80 kg/cm$^2$. After completion of the injection, the nitrogen gas filled in the mold 8 was discharged over 1 second and a core of the mold 8 was caused to retreat 2 mm, whereby an expansion-molded resin product, that is, a dumbbell for tensile test (specimen thickness: 4 mm) was obtained.

Evaluation results of the expanded product are shown in Table 1. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 2

An expansion-molded polystyrene resin product, that is, a dumbbell for tensile test was obtained following the procedures of Example 1 except that an adapter 2 equipped with a built-in static mixer was connected to a delivery path of the continuous plasticator 1 and the temperature of the adapter 2 was set successively at 200° C., 160° C. and 120° C. in the flowing direction to control the resin temperature of the molten resin composition to 120° C.

Evaluation results of the expanded product are shown in Table 1. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 3

An expansion-molded polystyrene resin product, that is, a dumbbell for tensile test was obtained as in Example 2 except that a resin accumulator 4 was connected to a delivery path of the adapter 2.

Evaluation results of the expanded product are shown in Table 1. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 4

An expansion-molded polystyrene resin product, that is, a dumbbell for tensile test was obtained as in Example 1 except that as a method for abruptly changing the internal pressure of the mold 8, the core of the mold 8 was caused to promptly retreat after completion of injection instead of the method which featured advance filling of nitrogen gas under a pressure of 80 kg/cm$^2$ in the mold 8 immediately before the molten resin composition was injected into the mold 8.

Evaluation results of the expanded product are shown in Table 1. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 5

An expansion-molded polystyrene resin product, that is, a dumbbell for tensile test was obtained as in Example 1 except that the temperature of the mold 8 as set at 20° C.

Evaluation results of the expanded product are shown in Table 1. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 6

An expansion-molded polystyrene resin product, that is, a dumbbell for tensile test was obtained as in Example 1 except that the temperature of the mold 8 as set at 80° C.

Evaluation results of the expanded product are shown in Table 1. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 7

An expansion-molded polystyrene resin product, that is, a dumbbell for tensile test was obtained as in Example 1 except that the amount of carbon dioxide was changed to 5 parts by weight.

Evaluation results of the expanded product are shown in Table 1. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

COMPARATIVE EXAMPLE 1

An expansion-molded polystyrene resin product, that is, a dumbbell for tensile test was obtained as in Example 1 except that the thickness of the dumbbell was changed to 4 mm by causing the core of the mold 8 to retreat beforehand while keeping the mold 8 filled with air of atmospheric pressure without filling the mold 8 with nitrogen gas of high pressure immediately before the molten resin composition was injected into the mold 8.

Evaluation results of the expanded product are shown in Table 1. The expanded product was not preferred for the low Izod impact strength, poor surface appearance, cells not having any very small average cell diameter, fewer cells and the like. It was therefore impossible to produce any expanded product intended in the present invention.

COMPARATIVE EXAMPLE 2

An expansion-molded polystyrene resin product, that is, a dumbbell for tensile test was obtained as in Example 1 except that the kneading and dissolution of the carbon dioxide and the molten resin was not conducted in the continuous plasticator 1 during the injection step but their kneading and dissolution was resumed after completion of the injection step.

Evaluation results of the expanded product are shown in Table 1. The expanded product was not preferred for the low Izod impact strength, poor surface appearance, cells not having any very small average cell diameter, fewer cells and the like. It was therefore impossible to produce any expanded product intended in the present invention.

Further, a cross-section of the expanded product was observed under a scanning electron microscope. Distribution of non-uniform cells of 50 to 100 μm in diameter was observed.

COMPARATIVE EXAMPLE 3

Figure 5:
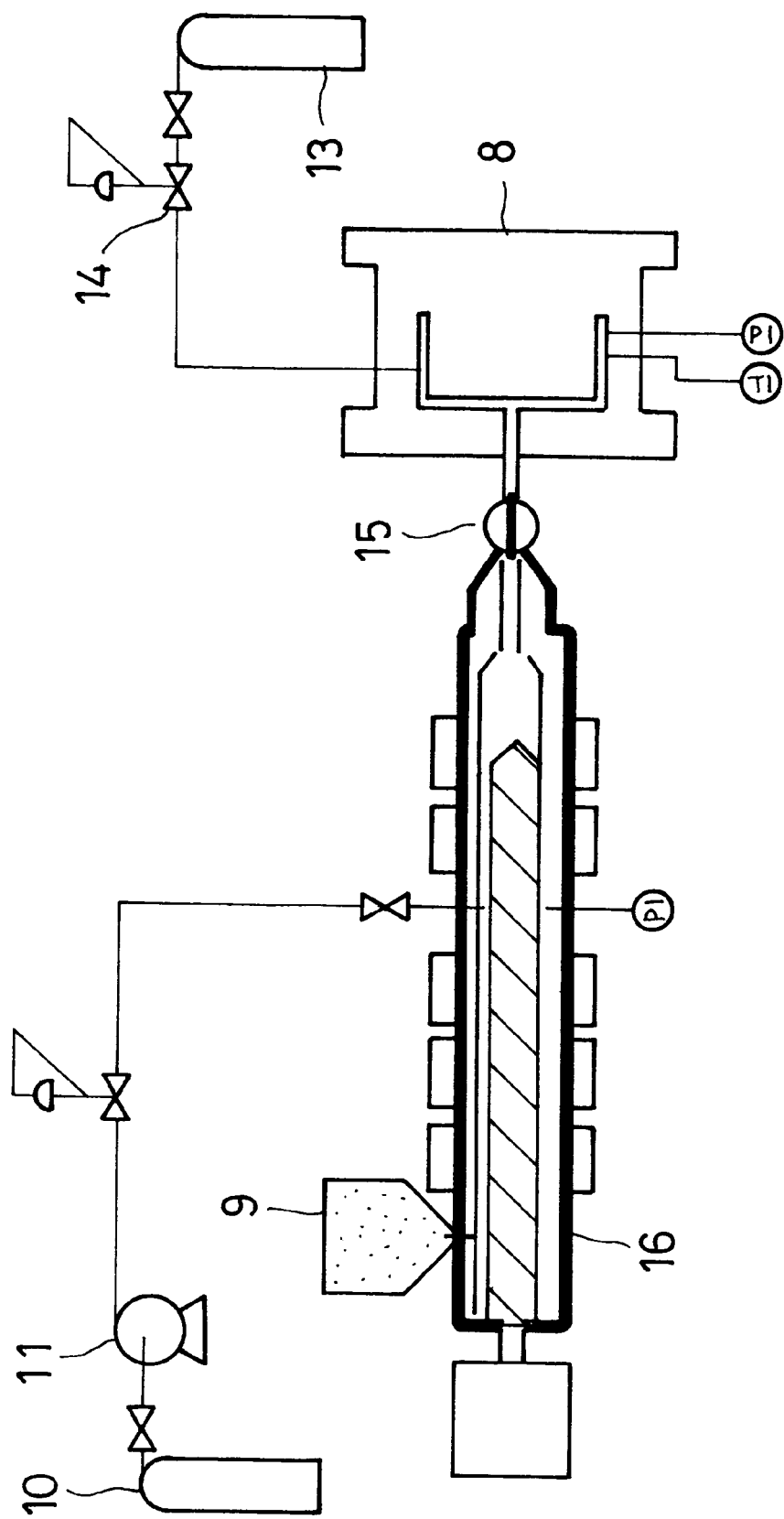
FIG. 5 is a schematic construction diagram illustrating a production process of an expanded thermoplastic resin product by a conventional extruder (Comparative Example 3)

One hundred parts by weight of pellets of a polystyrene resin having a melt flow index of 2.6 g/10 minutes at 200° C. under 5 kg ("TOPOREX 555-57", trade name; product of Mitsui-Toatsu Chemicals Inc.) were fed into an in-line injection molding machine shown in FIG. 5, having a bore diameter of 30 mm and equipped with a screw 12 having an L/D ratio of 30 (cylinder temperature: 230 to 150° C.). The resin was heated and molten at 230° C. Upon complete melting of the resin, 15 parts by weight of carbon dioxide were fed after compressing it to 180 kg/cm$^2$, i.e., into a supercritical state by the compressor pump 11. After metering, the rotation of the screw was stopped to interrupt the gas dissolution step and the cooling step. As a consequence of the stopping of the screw, the screw back-pressure was eliminated. After the metering, the molten resin was injected into the mold 8 whose temperature was set at 50° C. At this time, the mold 8 immediately before the injection was filled with nitrogen gas under a pressure of 80 kg/cm$^2$. After completion of the injection, the nitrogen gas filled in the mold 8 was discharged over 1 second and the core of the mold 8 was caused to retreat 2 mm, whereby an expansion-molded resin product, that is, a dumbbell for tensile test (specimen thickness: 4 mm) was obtained.

Evaluation results of the expanded product are shown in Table 1. The expanded product was not preferred for the low Izod impact strength, poor surface appearance, cells not having any very small average cell diameter, fewer cells and the like. It was therefore impossible to produce any expanded product intended in the present invention.

EXAMPLES 8–10

In each Example, an injection molding machine of the same type as that employed in Example 3 was provided with a mold 8 which was able to form a sheet having dimensions of 80×80×6 (thickness) mm. The thickness was rendered adjustable in a range of from 6 mm to 15 mm depending on the distance of a retreat of a core. Polystyrene equivalent to that employed in Example 3 was used as a molding material. The procedures of Example 3 were followed except that the amount of the carbon dioxide to be injected was changed to 8 parts by weight. The specific gravity of the thus-obtained sheet was measured. Also measured By observation of an SEM photograph were the thicknesses of unexpanded skin layers and the average cell diameter and cell population of an expanded layer. By a high-speed impact tester ("RIT8000", trade name; manufactured by Rheometrics, Inc.), its plane impact strength (fracture energy) was measured under the following conditions—temperature: 0° C., dart diameter: ½ inch, support diameter: 2 inches, dart speed: 10 m/sec. The results are shown in Table 2. The average cell diameter was small even when the thickness was large.

EXAMPLES 11–12

Expanded sheets were obtained as in Examples 8–10 except that a mold 8 capable of forming a sheet having dimensions of 80×80×15 (thickness) mm was attached and the thickness was adjustable in a range of from 20 mm to 50 mm depending on the distance of a retreat of a core. The results are shown in Table 2. The average cell diameter was small even when the thickness was large.

COMPARATIVE EXAMPLES 4–8

Figure 6:
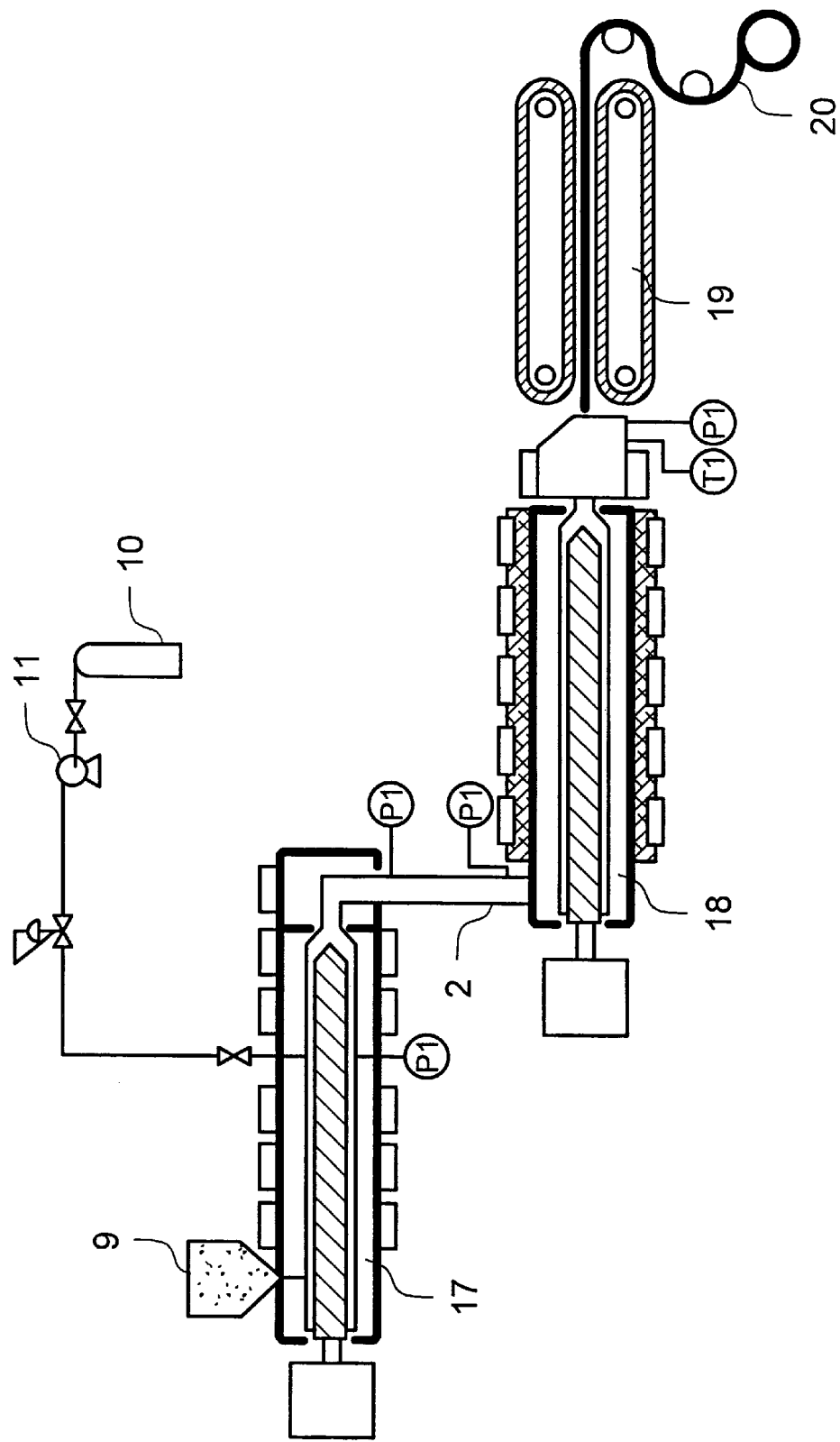
FIG. 6 is a schematic construction diagram illustrating production processes of expanded thermoplastic resin products by extrusion (Comparative Examples 4–6)
Figure 8:
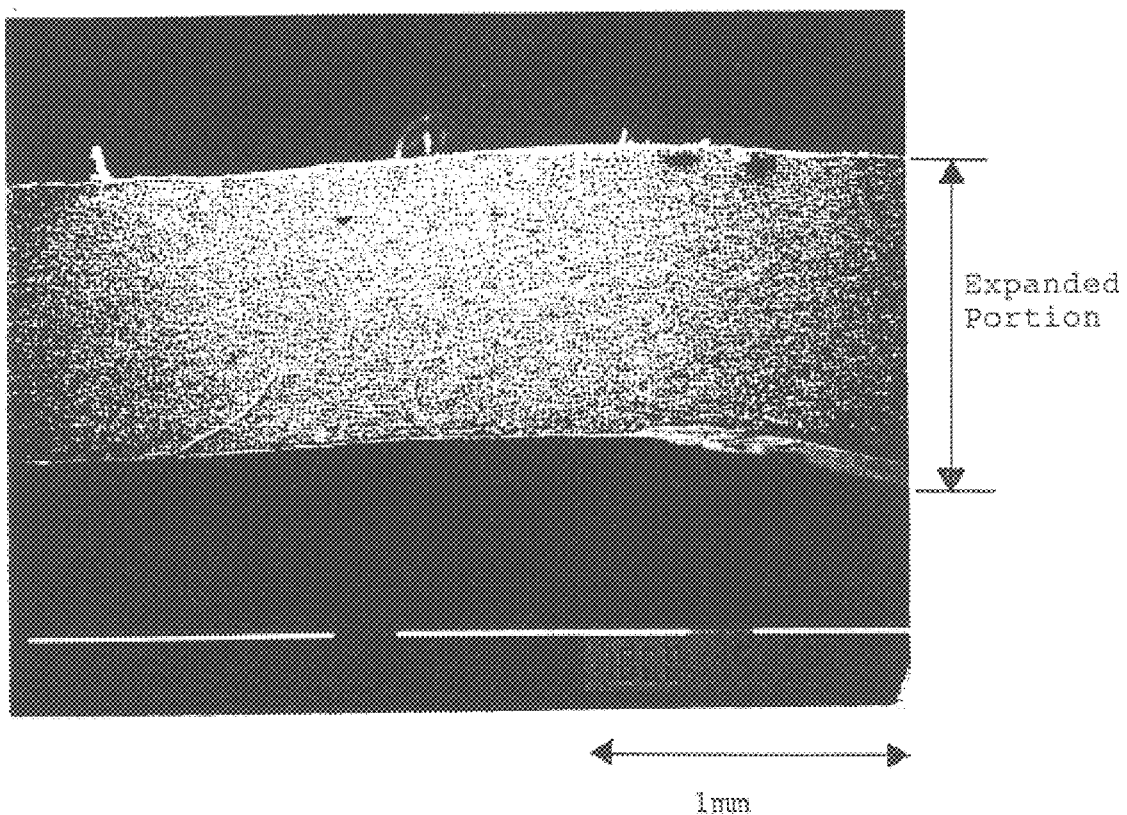
FIG. 8 is an illustrative cross-sectional photograph of an expanded thermoplastic resin product produced by expanding extrusion.

In each Comparative Example, a tandem extruder which was composed of a first extruder 17 (screw diameter: 50 mm, L/D: 25, cylinder temperature: 180 to 220° C.) and a second extruder 18 (screw diameter: 65 mm, L/D: 38, cylinder temperature: 150° C.) was fitted with an extrusion die and a cooling apparatus 19, as shown in FIG. 6. While controlling the die temperature at 140° C., carbon dioxide was injected in an amount of 8 parts by weight into the first extruder at a position 400 mm back from a free end of a screw so that an expanded sheet 20 was obtained. By adjusting the lip opening, the extruded amount and the internal pressure of the die, sheets of 6 to 15 mm in thickness were obtained. Similar to Example 8, their specific gravities, average cell diameters, cell populations and plane impact strengths were measured. The results are shown in Table 2. Compared with Examples 8–12 in which the injection molding was used, the average cell diameter became greater with the thickness. Further, the plane impact strengths were lower compared with Examples 8–12. As is shown in FIG. 8, the surface layers of each expanded sheet obtained by the expanding extrusion method were expanded like its inner layer and no unexpanded dense layers were included.

EXAMPLE 13

After 1 part by weight of polydimethylsiloxane was dry-blended to 100 parts by weight of pellets of a polystyrene resin having a melt flow index of 2.6 g/10 minutes at 200° C. under 5 kg ("TOPOREX 555-57", trade name; product of Mitsui-Toatsu Chemicals Inc.), the resultant mixture was fed from the hopper 9 into the continuous plasticator 1 having the bore diameter of 30 mm and equipped with the screw 12 having an L/D ratio of 30. The mixture was heated and rendered molten at 230° C. Upon complete melting of the resin, 15 parts by weight of carbon dioxide were fed after compressing it to 180 kg/cm$^2$, i.e., into a supercritical state by the compressor pump 11. The carbon dioxide and the molten resin were kneaded together and dissolved with each other in the continuous plasticator 1. The resin temperature of the molten resin composition was gradually cooled to 150° C. After metering the thus-cooled molten resin composition into an injector 7 controlled at 150° C., the molten resin composition was injected into a mold 8 whose temperature was set at 50° C. At this time, the mold 8 immediately before the injection was filled with nitrogen gas under a pressure of 80 kg/cm$^2$. After completion of the injection, the nitrogen gas filled in the mold 8 was discharged over 1 second and a core of the mold 8 was caused to retreat 2 mm, whereby an expansion-molded resin product, that is, a dumbbell for tensile test (specimen thickness: 4 mm) was obtained. The molding was continuously repeated by setting the cooling time in the mold 8 at 30 seconds. After release from the mold, absolutely no expanded product however developed such a problem that its surface became defective due to secondary expansion.

Evaluation results of the expanded product are shown in Table 3. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 14

An expanded product was obtained as in Example 13 except that 2 parts by weight of talc having an average particle diameter of 2 μm were also added beside the polystyrene resin and the polydimethylsiloxane.

Evaluation results of the expanded product are shown in Table 3. The expanded product was improved in Izod impact strength, had good surface appearance, and contained cells of a very small average cell diameter at a uniform cell population.

EXAMPLES 15–18

In each Example, an expanded product was obtained as in Example 13 except that the proportions of the polystyrene, polydimethylsiloxane and carbon dioxide were set as shown in Table 3. Evaluation results of the expanded product are shown in Table 3. The expanded product was improved in Izod impact strength, had good surface appearance, and had an expanded portion as an intermediate layer and unexpanded portions integrated as surface layers with the expanded portion.

The unexpanded portion contained cells of a very small average cell diameter at a uniform cell population.

EXAMPLE 19

An expanded product was obtained as in Example 13 except that the polystyrene resin was replaced by another polystyrene resin having a melt flow index of 10 g/10 minutes at 200° C. under 5 kg ("TOPOREX 525-51", trade name; product of Mitsui-Toatsu Chemicals Inc.). Evaluation results of the expanded product are shown in Table 3. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 20

An expanded product was obtained as in Example 13 except that the polystyrene resin was replaced by a further polystyrene resin having a melt flow index of 1.8 g/10 minutes at 200° C. under 5 kg ("TOPOREX 575-57", trade name; product of Mitsui-Toatsu Chemicals Inc.). Evaluation results of the expanded product are shown in Table 3. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

COMPARATIVE EXAMPLES 9–11

In each Comparative Example, an expanded product was obtained as in Example 13 except that the proportions of the polystyrene resin, polydimethylsiloxane and carbon dioxide were set as shown in Table 3. Evaluation results of the expanded product are shown in Table 3. The expanded product was not preferred for the low Izod impact strength, poor surface appearance, cells not having any very small average cell diameter, fewer cells and the like. It was therefore impossible to produce any expanded product intended in the present invention.

EXAMPLE 21

After 1 part by weight of perfluoropropyl montanoate was dry-blended to 100 parts by weight of pellets of a polystyrene resin having a melt flow index of 2.6 g/10 minutes at 200° C. under 5 kg ("TOPOREX 555-57", trade name; product of Mitsui-Toatsu Chemicals Inc.), the resultant mixture was fed from the hopper 9 into the continuous plasticator 1 having the bore diameter of 30 mm and equipped with the screw 12 having an L/D ratio of 30. The mixture was heated and molten at 230° C. Upon complete melting of the resin, 15 parts by weight of carbon dioxide were fed after compressing it to 180 kg/cm$^2$, i.e., into a supercritical state by the compressor pump 11. The carbon dioxide and the molten resin were kneaded together and dissolved with each other in the continuous plasticator 1. The resin temperature of the molten resin composition was gradually cooled to 150° C. After metering the thus-cooled molten resin composition into an injector 7 controlled at 150° C., the molten resin composition was injected into a mold 8 whose temperature was set at 50° C. At this time, the mold 8 immediately before the injection was filled with nitrogen gas under a pressure of 80 kg/cm$^2$. After completion of the injection, the nitrogen gas filled in the mold 8 was discharged over 1 second and a core of the mold 8 was caused to retreat 2 mm, whereby an expansion-molded resin product, that is, a dumbbell for tensile test (specimen thickness: 4 mm) was obtained. The molding was continuously repeated by setting the cooling time in the mold 8 at 30 seconds. After release from the mold, absolutely no expanded product however developed such a problem that its surface became defective due to secondary expansion.

Evaluation results of the expanded product are shown in Table 4. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 22

An expanded product was obtained as in Example 21 except that 2 parts by weight of talc having an average particle diameter of 2 $\mu$m were also added beside the polystyrene resin and the perfluoropropyl montanoate.

Evaluation results of the expanded product are shown in Table 4. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLES 23–26

In each Example, an expanded product was obtained as in Example 21 except that the proportions of the polystyrene resin, perfluoropropyl montanoate and carbon dioxide were set as shown in Table 4.

Evaluation results of the expanded product are shown in Table 4. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 27

An expanded product was obtained as in Example 21 except that the polystyrene resin was replaced by another polystyrene resin having a melt flow index of 10 g/10 minutes at 200° C. under 5 kg ("TOPOREX 525-51", trade name; product of Mitsui-Toatsu Chemicals Inc.). Evaluation results of the expanded product are shown in Table 4. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

EXAMPLE 28

An expanded product was obtained as in Example 21 except that the polystyrene resin was replaced by a further polystyrene resin having a melt flow index of 1.8 g/10 minutes at 200° C. under 5 kg ("TOPOREX 575-57", trade name; product of Mitsui-Toatsu Chemicals Inc.). Evaluation results of the expanded product are shown in Table 4. The expanded product was improved in Izod impact strength, had good surface appearance, and had an expanded portion as an intermediate layer and unexpanded portions integrated as surface layers with the expanded portion. The unexpanded portion contained cells of a very small average cell diameter at a uniform cell population.

COMPARATIVE EXAMPLES 12–14

In each Comparative Example, an expanded product was obtained as in Example 21 except that the proportions of the polystyrene resin, perfluoropropyl montanoate and carbon dioxide were set as shown in Table 4.

Evaluation results of the expanded product are shown in Table 4. The expanded product was not preferred for the low Izod impact strength, poor surface appearance, cells not having any very small average cell diameter, fewer cells and the like. It was therefore impossible to produce any expanded product intended in the present invention.

TABLE 1

|  | Example | | | | | | | Comparative Example | | |
| --- | --- | --- | --- | --- | --- | --- | --- | --- | --- | --- |
|  | 1 | 2 | 3 | 4 | 5 | 6 | 7 | 1 | 2 | 3 |
| Polystyrene resin (parts by weight) | 100 | 100 | 100 | 100 | 100 | 100 | 100 | 100 | 100 | 100 |
| Carbon dioxide (parts by weight) | 15 | 15 | 15 | 15 | 15 | 15 | 15 | 15 | 15 | 15 |
| Surface appearance | A | A | A | A | A | A | A | B | B | B |
| Average cell diameter ($\mu$m) | 8 | 5 | 2 | 10 | 12 | 12 | 30 | 50–100 | 50–100 | 50–100 |
| Average cell population (cells/cm$^2$) | $5 \times 10^8$ | $1 \times 10^9$ | $1 \times 10^{10}$ | $5 \times 10^8$ | $4 \times 10^8$ | $5 \times 10^8$ | $2 \times 10^8$ | — | — | — |
| Uniformity of cells | A | A | A | A | A | A | A | C | C | C |
| Thickness of surface layer ($\mu$m) | 80 | 78 | 72 | 84 | 660 | 22 | 180 | 12 | 20 | 15 |
| Izod impact strength (kg-cm/cm$^2$) | 2.08 | 2.14 | 2.32 | 2.05 | 2.20 | 1.96 | 1.90 | 1.50 | 1.48 | 1.50 |
| Improvement in impact strength (%) | 18 | 22 | 32 | 17 | 25 | 11 | 8 | −15 | −16 | −15 |

TABLE 2

|  | Example | | | | | Comparative Example | | | | |
| --- | --- | --- | --- | --- | --- | --- | --- | --- | --- | --- |
|  | 8 | 9 | 10 | 11 | 12 | 4 | 5 | 6 | 7 | 8 |
| Polystyrene resin (parts by weight) | 100 | 100 | 100 | 100 | 100 | 100 | 100 | 100 | 100 | 100 |
| Carbon dioxide (parts by weight) | 8 | 8 | 8 | 8 | 8 | 8 | 8 | 8 | 8 | 8 |
| Distance of core retreat (mm) | 0 | 5 | 9 | 5 | 30 | — | — | — | — | — |
| Specific gravity | 0.81 | 0.52 | 0.32 | 0.78 | 0.43 | 0.85 | 0.48 | 0.34 | 0.060 | 0.030 |
| Thickness of product (mm) | 6.1 | 10.0 | 14.9 | 20.2 | 50.1 | 6.3 | 11.2 | 15.2 | 21.0 | 48.2 |
| Thickness of surface layer ($\mu$m) | 78 | 105 | 92 | 88 | 95 | 0 | 0 | 0 | 0 | 0 |
| Surface appearance | A | A | A | A | A | B | B | B | B | B |
| Average cell diameter ($\mu$m) | 15 | 18 | 20 | 15 | 20 | 17 | 50 | iOO | 500 | 700 |
| Average cell population (cells/cm$^2$) | $4 \times 10^8$ | $3 \times 10^8$ | $2 \times 10^8$ | $4 \times 10^8$ | $3 \times 10^8$ | $3 \times 10^8$ | $1 \times 10^6$ | $1 \times 10^3$ | $5 \times 10^2$ | $1 \times 10^2$ |
| Uniformity of cells | A | A | A | A | A | A | C | C | C | C |
| Plane impact strength (J) | 15 | 16 | 18 | 21 | 23 | 11 | 10 | 8 | 6 | 3 |

TABLE 3

|  | Example | | | | | | | | Comparative Example | | |
| --- | --- | --- | --- | --- | --- | --- | --- | --- | --- | --- | --- |
|  | 13 | 14 | 15 | 16 | 17 | 18 | 19 | 20 | 9 | 10 | 11 |
| Polystyrene resin (parts by weight) | 100 | 100 | 100 | 100 | 100 | 100 | 100 | 100 | 100 | 100 | 100 |
| Polydimethylsiloxane (parts by weight) | 1 | 1 | 1 | 1 | 0.5 | 5 | 1 | 1 | 1 | 15 | 1 |
| Carbon dioxide (parts by weight) | 15 | 15 | 3 | 25 | 15 | 15 | 15 | 15 | 0.05 | 15 | 40 |
| Talc (parts by weight) | 0 | 2 | 0 | 0 | C | 0 | 0 | 0 | 0 | 0 | 0 |
| Surface appearance | A | A | A | A | A | A | A | A | A | A | B |
| Average cell diameter ($\mu$m) | 8 | 6 | 20 | 3 | 10 | 4 | 10 | 6 | 50 | 100 | 8 |
| Average cell population (cells/cm$^2$) | $3 \times 10^9$ | $8 \times 10^9$ | $2 \times 10^8$ | $9 \times 10^9$ | $1 \times 10^9$ | $8 \times 10^9$ | $2 \times 10^9$ | $5 \times 10^9$ | $3 \times 10^6$ | $3 \times 10^3$ | $8 \times 10^9$ |

TABLE 3-continued

|  | Example |  |  |  |  |  |  |  | Comparative Example |  |  |
|---|---|---|---|---|---|---|---|---|---|---|---|
|  | 13 | 14 | 15 | 16 | 17 | 18 | 19 | 20 | 9 | 10 | 11 |
| Uniformity of cells | A | A | A | A | A | A | A | A | C | 8 | C |
| Thickness of surface layer ($\mu$m) | 80 | 84 | 410 | 20 | 78 | 88 | 80 | 90 | 1100 | 22 | 8 |
| Izod impact strength (kg-cm/cm$^2$) | 2.12 | 2.12 | 1.95 | 2.24 | 2.06 | 2.24 | 2.06 | 2.10 | 1.70 | 1.52 | 1.74 |
| Improvement in impact strength (%) | 20 | 20 | 11 | 27 | 17 | 27 | 34 | 15 | −4 | −14 | −1 |

TABLE 4

|  | Example |  |  |  |  |  |  |  | Comparative Example |  |  |
|---|---|---|---|---|---|---|---|---|---|---|---|
|  | 21 | 22 | 23 | 24 | 25 | 26 | 27 | 28 | 12 | 13 | 14 |
| Polystyrene resin (parts by weight) | 100 | 100 | 100 | 100 | 100 | 100 | 100 | 100 | 100 | 100 | 100 |
| Perfluoropropyl Montanoate (parts by weight) | 1 | 1 | 1 | 0.5 | 5 | 1 | 1 | 1 | 15 | 1 |  |
| Carbon dioxide (parts by weight) | 15 | 15 | 3 | 25 | 15 | 15 | 15 | 15 | 0.05 | 15 | 40 |
| Talc (parts by weight) | 0 | 2 | 0 | 0 | 0 | 0 | 0 | 0 | 0 | 0 | 0 |
| Surface appearance | A | A | A | A | A | A | A | A | A | A | B |
| Average cell diameter ($\mu$m) | 8 | 7 | 18 | 3 | 10 | 6 | 10 | 6 | 50 | 100 | 8 |
| Average cell population (cells/cm$^2$) | $2 \times 10^9$ | $5 \times 10^9$ | $2 \times 10^8$ | $8 \times 10^9$ | $2 \times 10^9$ | $7 \times 10^9$ | $1 \times 10^9$ | $4 \times 10^9$ | $3 \times 10^6$ | $3 \times 10^3$ | $7 \times 10^9$ |
| Uniformity of cells | A | A | A | A | A | A | A | A | C | B | C |
| Thickness of surface layer ($\mu$m) | 78 | 86 | 390 | 26 | 88 | 82 | 80 | 94 | 1050 | 24 | 10 |
| Izod impact strength (kg-cm/cm$^2$) | 2.14 | 2.12 | 1.96 | 2.24 | 2.10 | 2.20 | 2.04 | 2.08 | 1.72 | 1.54 | 1.72 |
| Improvement in Impact strength (%) | 22 | 20 | 11 | 27 | 19 | 25 | 32 | 14 | −2 | −12 | −2 |

What is claimed is:

1. A process for the production of the injection-expansion molded, thermoplastic resin product comprising an expanded portion as an inner layer and an unexpanded portion as a surface layer, said expanded portion having an average cell diameter of from 0.01 to 50 $\mu$m and an average cell population of from $10^8$ to $10^{16}$ cells/cm$^3$, and said unexpanded portion having a thickness of from 10 to 1,000 $\mu$m and integrated with said expanded portion, said process comprising:

(I) as a gas dissolving step, melting 100 parts by weight of a thermoplastic resin at 100 to 450° C. in a continuous plasticator equipped with a feed line for a blowing agent, adding supercritical carbon dioxide and/or nitrogen in a proportion of 0.1 to 30 parts by weight per 100 parts by weight of said thermoplastic resin, and forming a molten resin composition in which said thermoplastic resin and said supercritical carbon dioxide and/or nitrogen are in mutually-dissolved state;

(II) as a cooling step, cooling, within said continuous plasticator, said molten resin composition to a temperature of from 50 to 300° C. while maintaining a pressure equal to or higher than a critical pressure of said carbon dioxide and/or nitrogen;

(III) as a metering and injection step, metering the thus-cooled molten resin composition by an injector, which is connected to said continuous plasticator and equipped with an injection plunger, and filling the same in a mold; and (IV) as an expansion controlling step, lowering an internal pressure of said mold to a pressure lower than said critical pressure of said carbon dioxide and/or nitrogen to produce cell nuclei, whereby said cell diameter is controlled;

wherein said carbon dioxide and/or nitrogen are maintained in a supercritical state up to said metering and injection step, and said gas dissolving step and cooling step by said continuous plasticator and said metering and injection step by said injector are conducted independently.

2. The process of claim 1, wherein between said continuous plasticator equipped with said feed line for said blowing agent and said injector equipped with said injection plunger, an adapter having a mixing portion is arranged so that said adapter is connected to a delivery path of said continuous plasticator, said delivery path being selectively connected to said injector via an on-off valve.

3. The process of claim 1, wherein said process produces an expanded product of 0.5 to 50 mm in thickness.

4. The process of claim 1, wherein said process produces an expanded product of 10 to 50 mm in thickness.

5. The process of claim 1, wherein said expansion control step is conducted by removing a high-pressure gas, which has been filled in said mold subsequent to the injection of said molten resin composition, and/or causing at least a portion of a core of said mold to retreat.

6. The process of claim 1, wherein a foam stabilizer is added further in a proportion of form 0.1 to 10 parts by weight to said thermoplastic resin.

7. The process of claim 1, wherein between said continuous plasticator equipped with said feed line for said blowing agent and said injector equipped with said injection plunger, a resin accumulator equipped with a plunger is arranged so that said resin accumulator is selectively connected to said injector via an on-off valve.

8. The process of claim 7, wherein between an adapter having a mixing portion and said injector equipped with said injection plunger, said resin accumulator equipped with said plunger is arranged so that said resin accumulator is selectively connected to said injector via said on-off valve.

9. The process of claim 1 wherein said expanded portion has an average cell diameter ranging from 0.01 to 20 $\mu$m and an average cell population ranging from $10^8$ to $10^{14}$ cells/$cm^3$.

* * * * *